(12) United States Patent
Murthy et al.

(10) Patent No.: US 8,467,517 B2
(45) Date of Patent: Jun. 18, 2013

(54) METHOD AND SYSTEM FOR CUSTOMIZING RING-BACK TONE IN AN INTER-OPERATOR TELECOMMUNICATION SYSTEM

(75) Inventors: Amit Murthy, Bangalore (IN); Devdutt Marathe, Bangalore (IN)

(73) Assignee: Onmobile Global Limited, Bangalore (IN)

( * ) Notice: Subject to any disclaimer, the term of this patent is extended or adjusted under 35 U.S.C. 154(b) by 291 days.

(21) Appl. No.: 12/811,227

(22) PCT Filed: Dec. 31, 2007

(86) PCT No.: PCT/IN2007/000630
§ 371 (c)(1),
(2), (4) Date: Jun. 30, 2010

(87) PCT Pub. No.: WO2009/084002
PCT Pub. Date: Jul. 9, 2009

(65) Prior Publication Data
US 2010/0290602 A1    Nov. 18, 2010

(51) Int. Cl.
*H04M 5/00*    (2006.01)
(52) U.S. Cl.
USPC ................................. 379/257; 379/114.13

(58) Field of Classification Search
USPC .................... 379/68–88.28, 114.13, 257
See application file for complete search history.

(56) References Cited

U.S. PATENT DOCUMENTS

| | | | |
|---|---|---|---|
| 7,929,681 B2* | 4/2011 | Henry | 379/218.01 |
| 2005/0246174 A1* | 11/2005 | DeGolia | 704/270 |
| 2007/0140446 A1* | 6/2007 | Haldeman et al. | 379/88.21 |
| 2007/0291927 A1* | 12/2007 | Batni et al. | 379/372 |
| 2008/0025478 A1* | 1/2008 | Taylor et al. | 379/70 |
| 2008/0120176 A1* | 5/2008 | Batni et al. | 705/14 |

* cited by examiner

*Primary Examiner* — Duc Nguyen
*Assistant Examiner* — Assad Mohammed
(74) *Attorney, Agent, or Firm* — Hoffmann & Baron, LLP

(57) ABSTRACT

A method and a system for providing commercial information (CI) messages as a ring-back tone (RBT) to a caller in an inter-operator telecommunication system are provided. In the inter-operator telecommunication system, the caller and the callee are registered to different telecommunication service providers. The second telecommunication service provider sends a request to the first telecommunication service provider to provide a CI id associated with a caller profile of the caller. The request is routed through a global broker. An RBT player of the second telecommunication service provider plays the CI message corresponding to the CI id as ring-back tone to the caller.

9 Claims, 5 Drawing Sheets

METHOD AND SYSTEM FOR CUSTOMIZING RING-BACK TONE IN AN INTER-OPERATOR TELECOMMUNICATION SYSTEM

FIELD OF THE INVENTION

The present invention relates to the field of telecommunication systems. More specifically, the invention relates to providing commercial information as a ring-back tone in an inter-operator telecommunication system.

DEFINITIONS

Caller: The mobile phone user who initiates a call is called a 'caller'

Callee: The mobile phone user to whom the call is made is called a 'callee'

Ring-back Tone (RBT): A tone which is played to the caller while he is waiting for the callee to respond to the call is called an RBT. The RBT is played until the callee responds to the call.

Inter-operator telecommunication system: A telecommunication system where the caller and the callee are registered to different telecommunication service providers is referred to as an inter-operator telecommunication system.

BACKGROUND OF THE INVENTION

A monotonous sound, hereinafter referred to as a ring-back tone (RBT), is heard by a caller while waiting for a callee to respond to a call. The RBT can be replaced by other tones, for example, songs, music, news, and sports commentary. Further, the RBT can be used for transmitting commercial information (CI) messages. CI messages may include advertisements, promotional offers and the likes.

There exist systems which provide the CI messages as the RBT to the caller based on the caller's profile. However, in the present system the caller and the callee are subscribed to the same telecommunication service provider. The caller profile of a caller is based on information regarding various caller attributes of the caller. Examples of caller attributes may include, but are not limited to, age of the caller and geographical location of the caller. Moreover, there is a problem in case the caller and the callee are registered to different telecommunication service providers. Telecommunication service providers do not share information about their subscribers with other telecommunication service providers because of information security policy provided by the telecommunication service providers to their subscribers. The information security policy is essential for ensuring privacy and confidentiality of subscriber's information.

In light of the above, there exists a need for providing CI messages as RBT to the caller in an inter-operator telecommunication system where the caller and the callee are registered to different telecommunication service providers. This makes the RBT more relevant to the caller and hence enables enhanced targeting of CI messages.

SUMMARY OF THE INVENTION

A method and a system to provide commercial information messages as a ring-back tone (RBT) to a caller in an inter-operator telecommunication system are disclosed. The commercial information may include advertisements, promotional offers and the likes. The caller is registered to a first telecommunication service provider and the callee is registered to a second telecommunication service provider.

According to an embodiment, a method for providing at least one commercial information (CI) message as a ring-back tone (RBT) to a caller is provided. A call is initiated by the caller to the callee. The method includes routing a request through a global broker for at least one CI id from the second telecommunication service provider to the first telecommunication service provider. The at least one CI id is associated with a caller profile of the caller. Further, the method includes receiving the at least one CI id through the global broker. Furthermore, the method includes playing the at least one CI message corresponding to the at least one CI id as the ring-back tone to the caller.

According to another embodiment, a system for providing at least one commercial information (CI) message as a ring-back tone (RBT) to a caller is provided. A call is initiated by the caller to the callee. The system includes a global broker for routing a request for at least one CI id associated with a caller profile of the caller from the second telecommunication service provider to the first telecommunication service provider. The system also includes a CI server for associating the at least one CI id with the caller profile of the caller. Further, the system includes a ring-back tone player for playing the at least one CI message to the caller.

DETAILED DESCRIPTION

In the following description, specific details are set forth in order to provide a thorough understanding of the invention. However, it will be apparent to a person ordinarily skilled in the art, that the invention may be practiced without these specific details. Various aspects and features of example embodiments of the invention are described in detail hereinafter.

A method and a system for providing commercial information (CI) messages in an inter-operator telecommunication system are disclosed. The method includes providing at least one CI message as RBT to the caller based on the caller's profile. The at least one CI message may include advertisements, promotional offers and the likes. The caller's profile is based on caller attributes such as caller geographical location, caller age, caller gender, caller phone bill and callee information. The callee information may include callee id and callee attributes.

Figure 1:
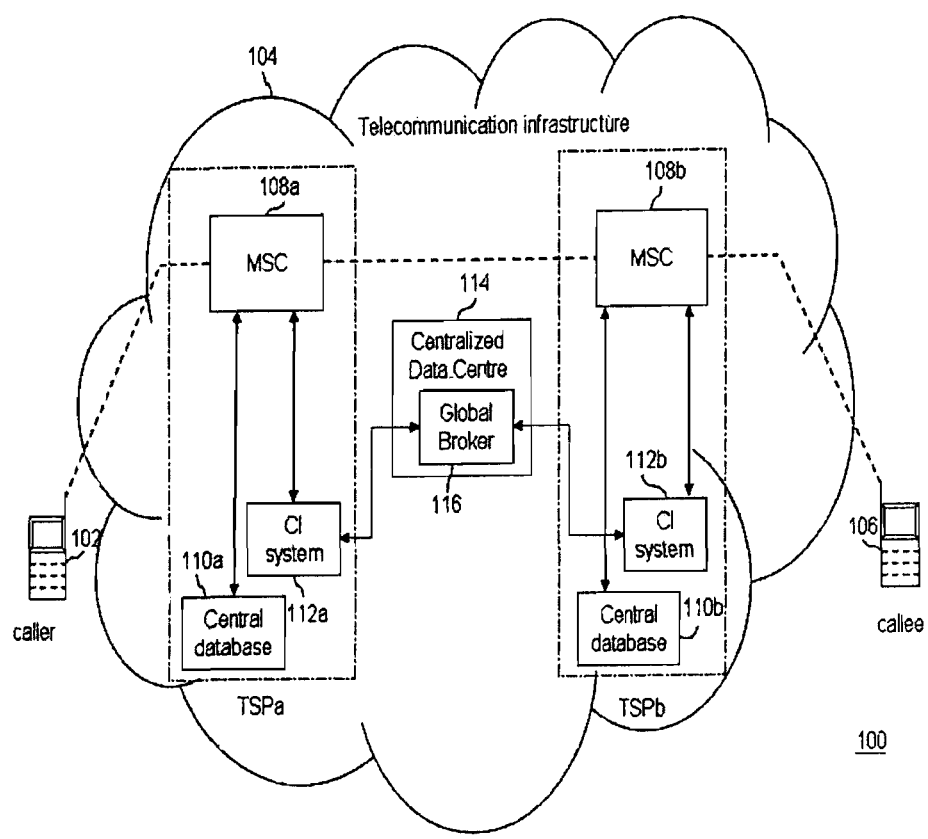
FIG. 1 is a schematic illustrating an inter-operator telecommunication system in accordance with an embodiment of the invention.

FIG. 1 is a schematic illustrating an inter-operator telecommunication system 100 in accordance with an embodiment of the invention. Inter-operator telecommunication system 100 includes a caller 102 and a callee 106 registered to two different telecommunication service providers TSPa and TSPb respectively. Although only two telecommunication service providers have been illustrated in the figure, it will be apparent to a person skilled in the art that there may be more telecommunication service providers in inter-operator telecommunication system 100. TSPa includes a Mobile Switching Center (MSC) 108*a*, a central database 110*a* and a Commercial Information (CI) system 112*a*. Similarly, TSPb includes a Mobile Switching Center (MSC) 108*b*, a central database 110*b* and a CI system 112*b*. Inter-operator telecommunication system 100 also includes a centralized data centre 114 maintained by a Value Added Services (VAS) provider. According to an embodiment, TSPa enables caller 102 to connect to a telecommunication infrastructure 104 for making a call to callee 106. Caller 102 and callee 106 may use a telecommunication terminal such as a landline telephone, mobile phone, etc. to connect to telecommunication infrastructure 104. The telecommunication terminal, for purposes of explanation, is hereinafter referred to as a mobile phone.

According to an embodiment, MSC 108*a* forwards the call to MSC 108*b* when caller 102 wants to communicate with callee 106. The call is also forwarded to CI system 112*b* by using a switch at MSC 108*b*. Central databases 110*a* and 110*b* are used to store subscription information related to the subscribers of TSPa and TSPb respectively. An example of central database 110 can be a Home Location Register (HLR). The subscription information for each subscriber includes a unique identifier for the subscriber, mobile phone number of the subscriber, current location of the subscriber, various value added services the subscriber is registered to, and the likes.

According to an embodiment of the invention, CI systems 112*a* and 112*b* play CI messages such as advertisements, promotional offers and the likes to a caller as RBT. Centralized data centre 114 can be accessed by the CI systems 112*a* and 112*b*. Centralized data centre 114 is responsible for storing and managing CI messages to be played to caller 102. Centralized data centre 114 includes a global broker 116. Global broker 116 facilitates communication between CI system 112*a* and CI system 112*b*.

Figure 2:
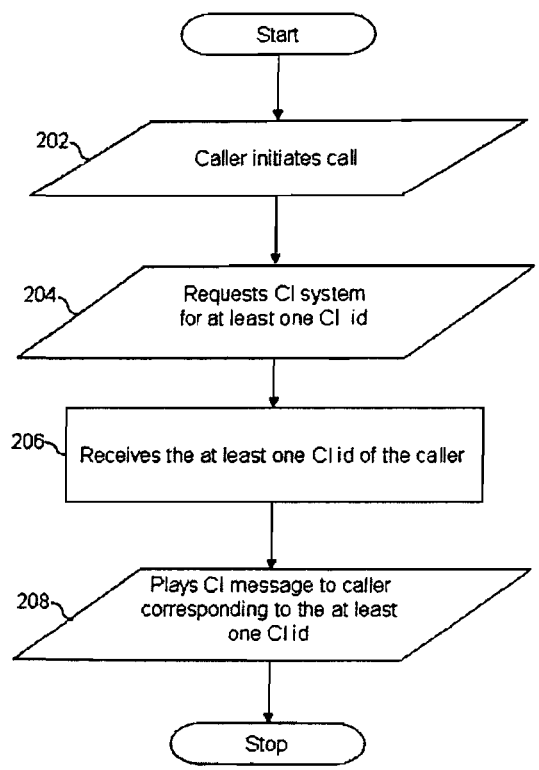
FIG. 2 is a flow diagram illustrating a method for providing CI messages as RBT to a caller in the inter-operator telecommunication system in accordance with an embodiment of the invention.

FIG. 2 is a flow diagram illustrating a method for providing the CI messages as RBT to caller 102 in inter-operator telecommunication system 100 in accordance with an embodiment of the invention. The CI messages may be classified into one or more categories, hereinafter referred to as CI campaigns. Each of the CI messages in the CI campaigns is associated with at least one CI id. At step 202, caller 102 initiates a call with callee 106. The call is routed through MSC 108*a* to MSC 108*b* based on a caller id. The caller id may, for an embodiment, be a unique identifier for caller 102, for example, phone number of caller 102. According to an embodiment, the caller id may be forwarded by MSC 108*a* to MSC 108*b*. The call is then forwarded to CI system 112*b* by using a switch at MSC 108*b* irrespective of caller 102's or callee 106's RBT subscription status.

At step 204, CI system 112*b* sends a request to the TSPa to provide at least one CI id corresponding to caller 102's profile. The request is routed through global broker 116. According to an embodiment, CI system 112*a* extracts the caller profile based on the caller id of the caller 102. Further, the caller profile is based on caller attributes values stored in customer database 412*a* (as shown in FIG. 4) of TSPa. Thereafter, CI system 112*a* associates the at least one CI id with the caller 102. At step 206, CI system 112*b* receives the at least one CI id of caller 102 transmitted by CI system 112*a* through global broker 116. According to an embodiment, CI system 112*b* receives the at least one CI id through a local broker in TSPb. At step 208, CI system 112*b* plays the CI message corresponding to the at least one CI id, to caller 102. CI system 112 is discussed in detail in conjunction with FIG. 3.

Figure 3:
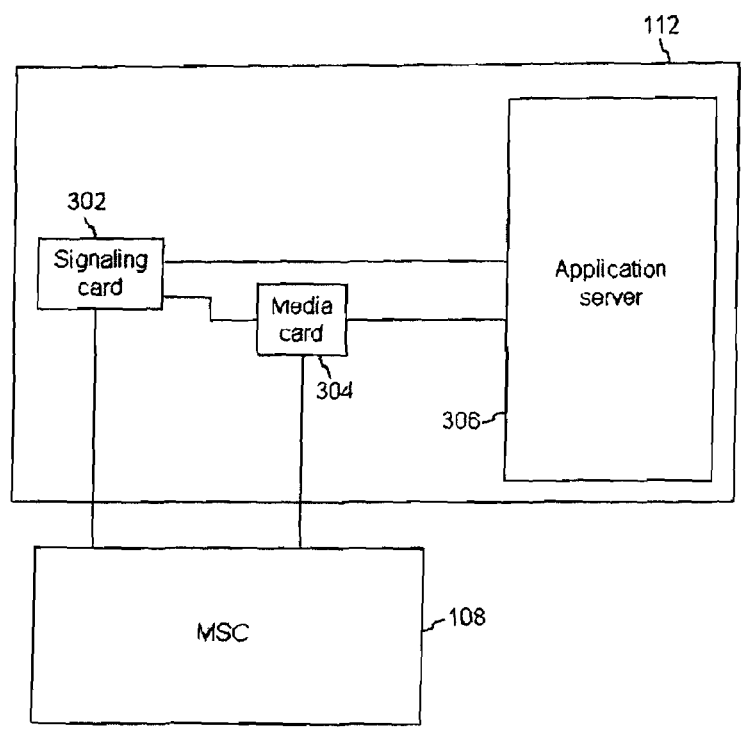
FIG. 3 is a block diagram illustrating a CI system in accordance with an embodiment of the invention.
Figure 4:
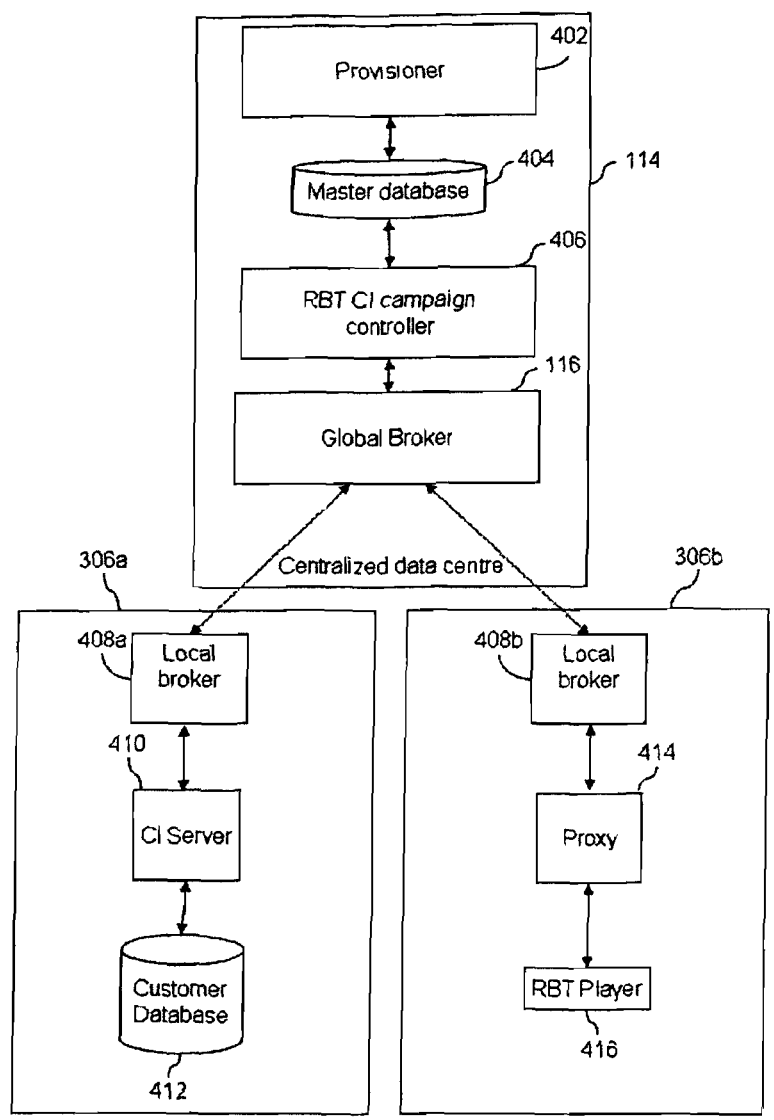
FIG. 4 is a schematic illustrating the inter-operator telecommunication system in accordance with an embodiment of the invention.

FIG. 3 is a block diagram illustrating CI system 112 in accordance with an embodiment of the invention. It will be apparent to a person ordinarily skilled in the art, that CI system 112 can be CI system 112*a* and CI system 112*b* based on the telecommunication service provider under consideration.

CI system 112 includes signaling cards 302 and media cards 304 for communication with MSC 108. MSC 108 may be MSC 108*a* or MSC 108*b* based on the telecommunication service provider under consideration. CI system 112 further includes an application server 306. Signaling cards 302 are used for processing signals from MSC 108. The signals provide specific information related to the call. According to an embodiment of the invention, MSC 108*a* sends signals regarding initiation of call by caller 102, termination of call by caller 102 and the likes. Further, MSC 108*b* sends signals regarding termination of call by callee 106, and the likes. The signals are transmitted using standard protocols such as SS7 protocol. An example of signaling card 302 is NMS TX-4000 cards. Signaling cards 302 include a software component used for signal handling. The software component may be written in C/C++ or any other programming language.

Media cards 304 are used for processing media, for example playback, recording, Dual-tone Multi-frequency (DTMF) etc., to and from MSC 108. An example of media card 304 is NMS AG-4040 card. Media cards 304 comprise a software component used for media processing and handling. The software component may be written in C/C++ or any other programming language. Media cards 304 and signaling cards 302 are connected to application server 306 and serve as a link between MSC 108 and application server 306. Further, application server 306 includes various applications based on computer programming languages like JAVA, C/C++, etc. The applications are invoked based on input from signaling cards 302 and media cards 304. According to an embodiment, application for playing the CI message to caller 102 is invoked. Any transfer of media to and from the applications in application server 306 is through media cards 304. For example, pressing of DTMF key by caller 102 is recognized by media cards 304 and then conveyed to application server 306.

FIG. 4 is a schematic illustrating the inter-operator telecommunication system 100, in accordance with an embodiment of the invention. According to an embodiment, the inter-operator telecommunication system 100 includes centralized data centre 114, application server 306*a* and application server 306*b*. Centralized data centre 114 is a centralized module maintained by the VAS provider. According to an embodiment, centralized data centre 114 may be accessed by both CI system 112*a* and CI system 112*b*. Centralized data centre 114 is responsible for storing and managing CI messages to be played to caller 102 as RBT.

Centralized data centre 114 includes a provisioner 402, a master database 404, an RBT CI campaign controller 406 and global broker 116. Provisioner 402 is a web-based front-end interface to upload and manage CI messages. According to an embodiment, provisioner 402 classifies the CI messages into one or more CI campaigns. Provisioner 402 assigns a CI id to each of the CI messages. A master database 404 stores the one or more CI campaigns, information regarding played CI campaigns and CI campaign history. Each CI campaign includes at least one CI message. CI campaign history includes, but is not limited to, CI campaigns which have been played, ongoing CI campaigns as well as CI campaigns which are queued for service. Master database 404 regularly updates an RBT player 416 with the one or more CI campaigns. Further, the one or more CI campaigns can be updated regularly. For example, the one or more CI campaigns can be updated after a regular time interval of 24 hours. RBT CI campaign controller 406 selects the CI campaigns that are to be played to caller 102 based on the CI campaign history. According to an embodiment, the CI campaigns may be played for a predefined amount of time, for example, five minutes.

Application server 306 includes a local broker, a CI server, a customer database, a proxy and an RBT player. According to an embodiment, application server 306 can be application server 306a and application server 306b based on the telecommunication service provider under consideration. In the present invention, application server 306a is deployed within CI system 112a and application server 306b is deployed within CI system 112b. Application server 306a includes local broker 408a, CI server 410 and customer database 412. Application server 306b includes local broker 408b, proxy 414 and RBT player 416. RBT CI campaign controller 406 updates CI server 410 with a plurality of CI ids at regular intervals. CI server 410 associates at least one CI id with the caller profile of caller 102. The caller profile of caller 102 is stored in customer database 412.

According to an embodiment, proxy 414 establishes connection between local broker 408a and RBT player 416. According to an embodiment, a plurality of RBT players can be provided by a telecommunication service provider. According to an embodiment, the connections established by proxy 414 are kept permanent with an auto-reconnect facility to reduce delay in serving requests and delivering responses between local broker 408b and RBT player 416. This can be explained in conjunction with the following example. In case RBT player 416 of TSPb is busy and cannot play the CI message corresponding to the at least one CI id, the request to play the CI message will be transferred via proxy 414 to another RBT player that is available. According to an embodiment, proxy 414 may route the at least one CI id to RBT player 416. Thereafter, RBT player 416 plays the CI message corresponding to the at least one CI id to caller 102.

Figure 5:
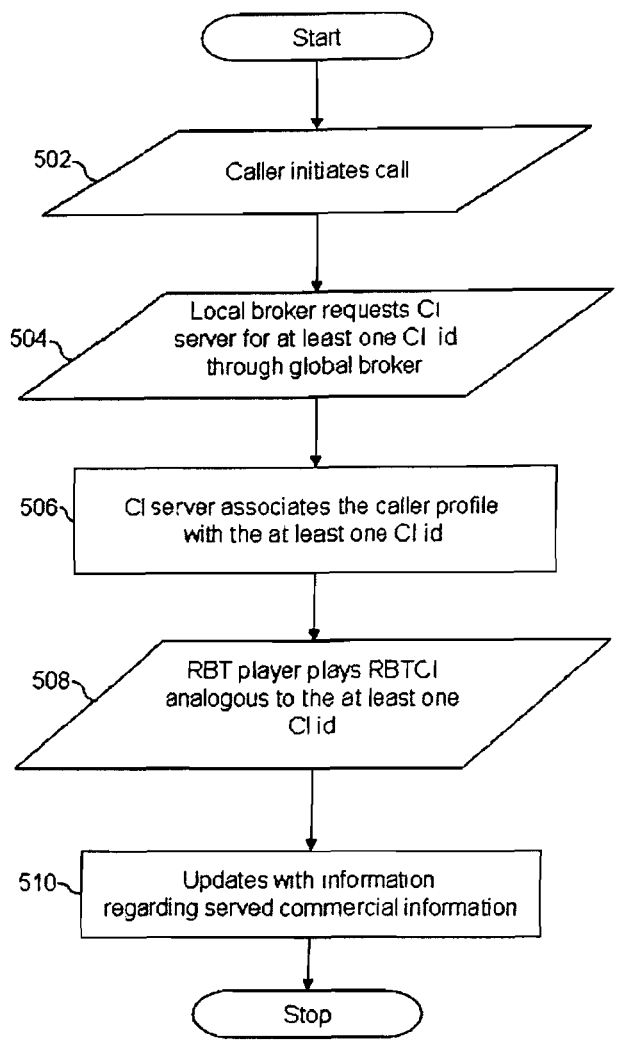
FIG. 5 is a flow diagram illustrating a method for providing CI messages as RBT to a caller in the inter-operator telecommunication system in accordance with another embodiment of the invention.

FIG. 5 is a flow diagram illustrating a method for providing CI messages as RBT to caller 102 in the inter-operator telecommunication system 100 in accordance with another embodiment of the invention.

At step 502, caller 102 initiates a call with callee 106. The call is routed through MSC 108a. MSC 108a forwards the call to MSC 108b based on the caller id. According to an embodiment, the caller id is also forwarded to MSC 108b by using a switch at MSC 108b. Thereafter, the call is forwarded to CI system 112b. RBT player 416 sends the caller id to local broker 408b via proxy 414. Local broker 408b checks whether caller 102 is registered to TSPb based on the caller id. At step 504, local broker 408b sends a request for the at least one CI id to CI system 112a when caller 102 is not registered to TSPb. The request for the at least one CI id is routed through global broker 116 to application server 306a. The request for the at least one CI id is further routed to CI server 410 through local broker 408a. CI server 410 accesses the caller profile of caller 102 stored in customer database 412 based on the caller id. According to an embodiment, data accessed from customer database 412 is encrypted using a hashing method to provide data security. Thereafter, at step 506, CI server 410 associates the caller profile with at least one CI id. The CI id is selected by CI server 410 from the different CI campaigns provided by the RBT CI campaign controller 406. According to an embodiment, the caller profile of caller 102 is associated with a default CI id when the CI id corresponding to a particular caller profile does not exist.

Thereafter, CI server 410 transmits the at least one CI id to application server 306b via local broker 408a and global broker 116 respectively. Local broker 408b routes the at least one CI id to RBT player 416 via proxy 414. At step 508, RBT player 416 selects and plays the CI message corresponding to the at least one CI id as RBT to caller 102.

At step 510, CI server 410 provides RBT CI campaign controller 406 with information regarding the CI message, hereinafter referred to as CI campaign information, played to caller 102. CI campaign information may include, but is not limited to, the at least one CI id played to caller 102, time for which the CI message was played, and the likes. RBT player 416 updates RBT CI campaign controller 406 with the CI campaign information. RBT CI campaign controller 406 then updates master database 404 with the CI campaign information. The update of CI campaign information can be real time or at regular intervals depending on the requirement.

It is understood that while certain forms of this invention have been illustrated and discussed, it is not limited thereto. However, various alterations may be made thereto without departing from the broader spirit and scope of the invention. The specification and drawings are, accordingly, to be regarded in an illustrative sense rather than a restrictive sense.

The invention claimed is:

1. A system for providing at least one commercial information (CI) message as a ring-back tone (RBT) to a caller, the caller having initiated a call with a callee, the caller being registered with a first telecommunication service provider, the callee being registered with a second telecommunication service provider, the system comprising:
   a. a global broker for routing a request to the first telecommunication service provider for at least one CI id associated with a caller profile of the caller, the request being generated by the second telecommunication service provider;
   b. a first CI server corresponding to the first telecommunication service provider, for associating the at least one CI id with the caller profile of the caller;
   c. a second CI server corresponding to the second telecommunication service provider for receiving the at least one CI id associated with the caller profile of the caller, wherein the at least one CI id is routed from the first telecommunication service provider to the second telecommunication service provider through the global broker; and
   d. a ring-back tone player corresponding to the second telecommunication service provider, for playing the at least one CI message to the caller.

2. The system of claim 1, wherein the caller profile is based on caller attributes, the caller attributes comprising one or more of caller geographical location, caller age, caller gender, caller phone bill and callee information.

3. The system of claim 1, wherein the first telecommunication service provider comprises a customer database for storing profiles of subscribers registered to the first telecommunication service provider.

4. The system of claim 1 further comprising a master database for storing at least one or more CI campaigns and information regarding CI campaigns played to the caller.

5. The system of claim 1 further comprising a local broker for routing the request for the at least one CI id to the global broker.

6. A method for acquiring caller information corresponding to a caller and delivering to the caller at least one commercial information (CI) message as a ring-back tone (RBT) based on the acquired caller information, the caller being registered with a first telecommunication network operated by a first telecommunication service provider and having initiated a call to a callee registered with a second telecommunication network operated by a second telecommunication service provider, the method comprising:

receiving at a first server within the first telecommunication network, a request for at least one CI id identifying a CI message to be played back to the caller by the second telecommunication network as a RBT, wherein the request is received through a global broker router outside of the first telecommunication network;

obtaining profile information for the caller from a customer database within the first telecommunication network;

determining at the first telecommunication network, at least one CI id based on the caller's profile information;

transmitting the at least one CI id to the global broker router;

routing the at least one CI id from the global broker router to a second server within the second telecommunication network;

selecting at the second server, a CI message identified by the at least one CI id; and transmitting the CI message for playback as a RBT to the caller.

7. The method of claim 6, wherein the caller's profile information comprises one or more of caller geographical location, caller age, caller gender, caller phone bill and callee information.

8. The method of claim 7, further comprising storing at a database within a centralized data center associated with the global broker router, at least one CI campaign and information regarding CI campaigns played to the caller.

9. The method of claim 8, wherein CI ids stored in the centralized data center are transmitted to the first server to update the CI id information stored at the first server.

* * * * *